2,716,263

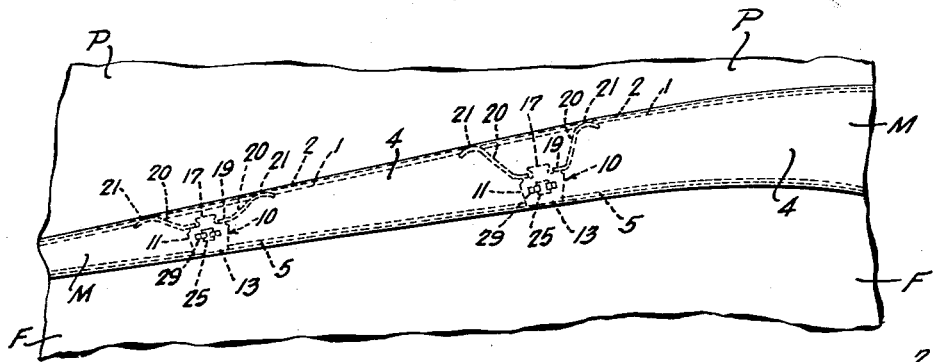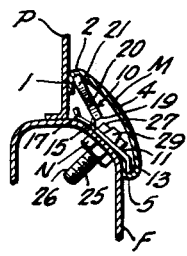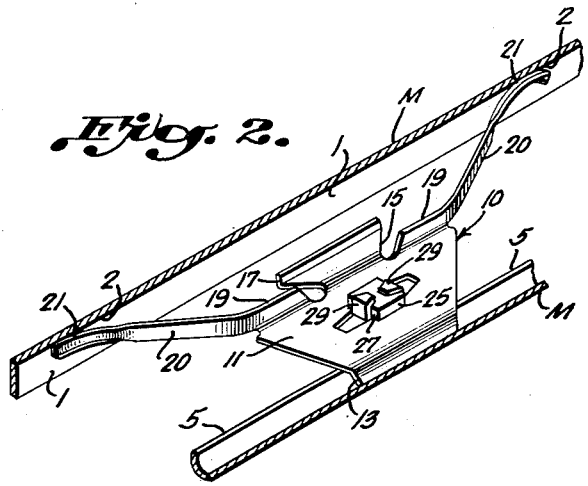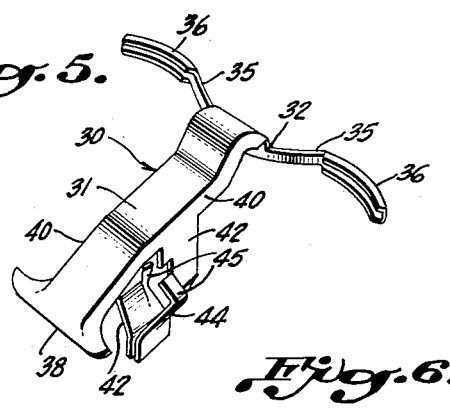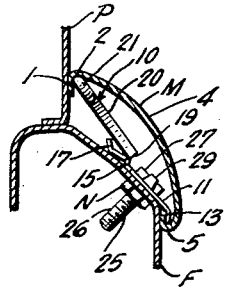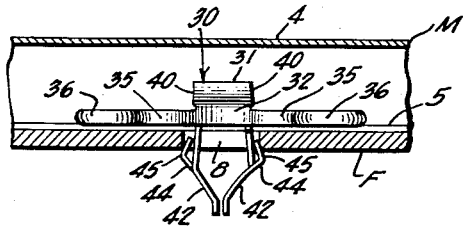
INVENTORS
LAURENCE H. FLORA
JOHN BALINT
ATTORNEY though the United States Patent Office 2,716,263
Patented Aug. 30, 1955

MOLDING CLIPS

Laurence H. Flora and John Balint, Cleveland, Ohio, assignors to Tinnerman Products, Inc., Cleveland, Ohio, a corporation of Ohio Application February 24, 1953, Serial No. 338,254

3 Claims. (Cl. 24—73)

This invention relates generally to clips or fasteners for securing moldings, trim strips, and the like, onto a supporting structure and deals, more particularly, with improved constructions for molding clips or fasteners of this character which are adapted for securing a molding of varying width along the length thereof or for securing various sizes of moldings in different widths.

In many instances, the construction of a molding clip or fastener is such that it is suitable for use only with a molding or trim strip of one width or size, and accordingly, a complete line of clips in different sizes must be provided for moldings of various widths or sizes. In the use of a molding clip or fastener suitable for securing various sizes of moldings in different widths, considerable savings and important advantages are involved inasmuch as only a single set of dies is required for making the clips and there is no problem of stocking and cataloging various sizes of clips. Moreover, manufacturing variations and inconsistencies frequently develop in the production of the moldings, particularly when made of plastic, such that the inner walls of the moldings are not always precise and uniform throughout their lengths. Consequently, in the use of molding clips or fasteners suitable only for a specific size of molding and which must fit precisely within the inner wall of the molding, there are usually several clips in an installation which are so loosely connected to the molding that the molding is not secured properly with complete effectiveness in the manner intended.

In a further relation, in the moldings provided on present day automobile bodies, cabinet structures, and the like, the moldings are usually designed for a streamlined effect by providing the same in a gradually increasing width from a narrow point at one end to a relatively wide flaring portion at the other end thereof. Accordingly, in these instances, it is highly desirable and advantageous, of course, to secure such a molding by a single size clip or fastener which is adaptable to any width of the molding along the length thereof.

It is, therefore, a primary object of this invention to provide an improved molding clip or fastener in a simplified sheet metal construction comprising a plate-like body portion having an outwardly bent strip or strip portions, or the like, on one side thereof defining elongate oppositely extending flexible spring arms which extend lengthwise in connected relation with a molding and are yieldable transversely of the molding so as to be automatically adjustable for connection to a molding of varying width or to different moldings of various widths, while otherwise adapted for effective, proper connection to moldings of a standard size in a manner to compensate for manufacturing variations and irregularities in the formation of the moldings.

Another object of the invention is to provide such a molding clip or fastener in which said elongate resilient spring arms extend lengthwise of the molding and yieldable transversely thereof, and define relatively wide bearing surfaces adapted for positive surface engagement with the inner wall of the molding under continuously effective spring tension.

A further object of the invention is to provide an improved molding clip or fastener, as aforesaid, in which the body of the clip is formed as a relatively large bearing plate, or the like, provided with oppositely extending elongate resilient spring arms on one side or end thereof that are yieldable transversely of the molding for effective connection thereto at various points along the length of a molding of varying width.

Further objects and advantages of the invention, and other new and useful features in the construction, arrangement and general combination of elements and details of construction of the improved molding clips or fasteners of the invention will be readily apparent as the following description proceeds with reference to the accompanying drawings, for purposes of illustration but not of limitation, in which like reference characters designate like parts throughout, and in which:

Fig. 1 is a plan or elevational view of a mounting for a molding which varies in width from a narrow point at one end to a relatively wide area at the other end thereof, and illustrates in dotted lines the manner in which molding clips of the same size are adapted to be connected at various points along the length of such a molding of varying width;

Fig. 2 is a perspective view from the top and side of one of the molding clips employed in Fig. 1 showing the connection thereof to the side flanges of the molding, represented in section, the crown of the molding being omitted;

Fig. 3 is a transverse sectional view on a line across the wider portion of the molding shown in Fig. 1 beyond the end of the molding clip in this area of the molding; and, Fig. 4 is a similar transverse sectional view on a line across the narrower portion of the molding shown in Fig. 1 beyond the end of the molding clip in this area of the molding.

Fig. 5 is a top perspective view of another form of molding clip in accordance with the invention; and, Fig. 6 is a vertical sectional view through a molding assembly showing the fastener of Fig. 5 as secured in a panel opening to retain the molding in mounted position in the assembly.

For purposes of illustration, the improved molding clips of the invention are shown as used in connection with a molding M of a type employed in automobile body decoration wherein the molding comprises an elongate, hollow rolled length of sheet metal which tapers in width as illustrated in Fig. 1, and is provided with inturned flanges 1 and 5, Figs. 2–4, inclusive, along the longitudinal edges thereof. The top or crown 4 of the molding M is suitably decorative and the interior of the molding is in the nature of a hollow channel-shaped wall with the upper inturned flange 1 being substantially flat and having a rounded surface 2 at the corner thereof adjacent said inturned flange 1. The flat flange 1 otherwise extends at an acute angle to the crown 4 of the molding while the lower inturned flange 5 is more or less rounded into a beading having a hook-like edge. Such a molding M is adapted to be secured over a seam, joint, or line of connection of a pair of panel members to conceal such seam or joint in the completed assembly. By way of example, Figs. 3 and 4 illustrate such a joint in an automobile construction where the curved panel portion of the fender F merges with the body panel P extending in generally vertical relation. The arrangement, accordingly, is such that the molding M extends over such joint with the flat flange 1 thereof bearing firmly on the panel P and the lower rounded flange 5 thereof extending along the curved surface of the fender panel F.

The molding clip or fastener 10, Figs. 1–4, inclusive, is formed from a suitable sheet metal blank which is stamped to provide a plate-like base 11 having the outer side thereof rounded off into a downwardly extending cam surface terminating in a lip element or projecting ledge 13 extending lengthwise of said base 11. The opposite side or end of said base 11 is formed with a lateral projection 15 which is bent upwardly at its junction with the base 11 and then downwardly into a bearing foot 17 which is substantially V-shaped in cross section. The base 11 including the foot portion 17 accordingly defines a substantial bearing plate adapted for a firm, rigid seating on the supporting surface therefor which, in the present example, is the fender panel F, Figs. 3 and 4.

On each side of said bearing foot 17, integral side strips 19 on said base 11 are provided to extend lengthwise of the clip and are upturned or bent outwardly out of the plane of the upper surface of said base 11. These integral side strips 19 include elongate extensions which project beyond the ends of the base 11 for any desired length and thereby define a pair of oppositely extending spring arms 20. It will be understood that the side strips 19 including the extensions thereon defining said spring arms 20, are integral portions of the blank and initially are in the plane of the base 11. When said side strips 19 are upturned or bent outwardly of the plane of said base 11 in substantially normal relation thereto, said extensions 20 have their flat surfaces disposed in position for snugly engaging the inner corner 2 of the molding adjacent the inturned flange 1. The spring arms 20, thus provided, are in the nature of elongate flexible leaf springs having their flat surfaces in work engaging position and bent laterally outwardly in diverging relation, substantially as shown in Fig. 2.

Important advantages are involved in thus providing said spring arms 20 with their flat faces in work engaging position in that said spring arms 20 are thereby adapted to move readily inwardly and outwardly relatively to the base 11 to connect properly and effectively at different points along a molding of varying widths, or with moldings of different widths, and otherwise compensate for any manufacturing variations in a supply of moldings in a specific size as provided for mass production methods of assembly. In addition, in providing said spring arms 20 with their flat surfaces in work engaging position, said flat surfaces are admirably suited to be formed into bearing portions having a curved or other formation corresponding to the contour of the inner surface of the corner 2 of the molding M which they engage so as to seat firmly and rigidly in connected relation with the molding under spring tension, thereby eliminating any loose fit of the clip within the molding which could result in a faulty assembly or squeaks, rattles and other annoying sounds in a completed installation. In the present example, the flat surfaces on the end portions of said spring arms 20 are stamped with outwardly curved or rounded bosses or protuberances 21 which fit snugly within the rounded corner portion 2 of the molding M. The rounded surface portions of said bosses 21 have the same general contour as the rounded surfaces of said corners 2 of the molding whereby said surfaces are in bearing engagement therewith over a relatively wide area to provide a firm and rigid connection of the spring arms 20 with the molding M in the most effective manner. In the diverging relation of the spring arms 20, such diverging relation is such that the bosses 21, thereon are normally spaced from the ledge or lip element 13 on the opposite side of said base 11 a distance greater than the space between the opposite corners of the molding adjacent the inturned flanges 1, 5, respectively. The spring arms 20, therefore, must be compressed toward the ledge or lip element 13 in a manner whereby said bosses 21 on the spring arms seat against the rounded surface of said corner 2 of the molding M under the expansive spring force of said spring arms in compressed relation.

In the form of the invention shown in Figs. 1–4, inclusive, the shank of the clip is provided by a suitable bolt, screw or other stud 25 united to the base or body portion 11 of the clip and having a shank 26 projecting from the undersurface thereof. In a preferred highly simplified construction, the shank 26 of the bolt or screw 23 extends through a passage in the base 11 of the clip, with the head 27 of said bolt seated on said base 11 and secured thereto by a pair of opposing tongues 29 which are stamped from said base 11 and bent over opposite sides of bolt head 27. The arrangement is such that said tongues 29 connect the bolt 25 to the base 11 and also prevent turning of the bolt 25 relative to said base 11 as the associated nut N is tightened on said bolt shank 26 in securing the molding clip 10 in a completed installation.

In completing an installation of a molding M substantially as shown in Fig. 1, it will be understood that as many of the molding clips or fasteners 10 as are necessary or desirable are effectively connected to the molding M at spaced points along the length thereof even though the same is of varying width inasmuch as the spring arms 20 of each molding clip 10 are adapted to yield and flex as necessary for this purpose. Each of the clips 10 is easily and quickly attached to the molding M simply by positioning the spring arms 20 of the clip lengthwise of the molding M with the rounded bosses 21 on the ends thereof seated in the rounded corner 2 adjacent the inturned flange 1 thereof, and with the shank 26 of the bolt projecting from the underside of said molding M. The spring arms 20 are thereupon readily compressed as necessary to permit the ledge or lip element 13 at the opposite side of the base 11 to cam over the edge of the hook-like molding flange 5 and snap into the corner adjacent said flange 5. The said compressed spring arms 20, thereupon, tend to assume their initial untensioned relation and thereby provide a continuously effective spring force which firmly and rigidly seats said bosses 21 on the spring arms 20 in the rounded corner 2 adjacent the flange 1, and the ledge or lip element 13 in positively connected relation with the opposite flange 5 of the molding. This connected relation of the molding clips 10 is substantially identical whether at a wide region of the molding M as seen in Fig. 3 or at a narrow area thereof as seen in Fig. 4, inasmuch as the spring arms 20 are sufficiently yieldable and flexible to adapt the clips 10 for effective connection to the molding M at any point along the length thereof even though the molding is of varying width, as aforesaid.

The molding M is then ready to be applied to the supporting part F which is prepared with a suitable number of shank receiving openings along the path which said molding M extends in mounted position thereon and with such shank receiving openings having a predetermined spacing corresponding to the spacing of the shanks 26 of the clips 10 in connected position on the molding M. The shank 26 of each clip 10 is inserted into its respective opening in the supporting panel F with the base 11 including the bearing foot 17 seating firmly and rigidly on said supporting panel F, and the shank 26 of the clip projecting from the underside thereof where it is secured in the usual manner by a nut N to complete the mounting of the molding M, substantially as shown in Figs. 3 and 4.

In an alternate procedure, the molding M may be similarly mounted by first securing the required number of molding clips 10 to the supporting panel F along the path which the molding M extends in mounted position thereon, substantially as illustrated in dotted lines in Fig. 1. The molding M is then applied to the several molding clips 10 by first slipping the flat flange 1 behind and under the bosses 21 on the free ends of the spring arms 20 to seat said bosses in the rounded corner 2 of the molding adjacent said flat flange 1. The molding M is then pressed transversely downwardly and toward the supporting panel F to bring the opposite hook-like flange 5 of the molding M into camming relation on the outer rounded cam surface of the ledge or lip element 13 along the opposite side of the plate-like base 11.

As the molding M is thus pressed transversely downwardly, the spring arms 20 are compressed and spread apart as necessary to permit said hook-like flange 5 of the molding M to slide on said ledge or lip element 13 in a camming action and snap over the edge of said ledge 13 where said hook-like flange 5 is disposed in positively connected relation with said ledge 13 as shown in Figs. 3 and 4. In this relation, the compressed spring arms 20 tend to move outwardly toward their initial untensioned relation and provide a continuously effective spring force which firmly and rigidly seats said bosses 21 on said spring arms 20 in the rounded corner 2 adjacent the flange 1 and the ledge or lip element 13 in positively connected relation with the opposite flange 5 of the molding. This connected relation of the molding clips 10, likewise, is substantially identical whether at a wide region of the molding M as seen in Fig. 3 or at a narrower area thereof as seen in Fig. 4, as aforesaid.

In the latter procedure, when the molding is placed over the several preattached molding clips 10 with the molding flange 1 inserted over the bosses 21 on the spring arms 20, and it is found that the base 11 of a clip is not completely in line with the molding, the pressing of the molding transversely downwardly toward the panel F in engaging the other molding flange 5 with the ledge or lip element 13 is such that either of the spring arms 20 is adapted to be compressed more than the other as necessary to provide automatically an effective seating of the bosses 21 on said spring arms 20 in the rounded corner 2 of the molding adjacent said flange 1. This automatic aligning ability of each clip minimizes the time required for mounting the molding, inasmuch as it is not necessary for the clips 10 to be precisely aligned in attached position prior to the snapping of the molding M over said clips 10 in the manner aforesaid.

Figs. 5 and 6 show another form of molding clip or fastener 30 in accordance with the invention wherein the base 31 thereof is provided on one side or end with an integral downwardly bent strip 32 defining similar oppositely extending spring arms 35 having rounded bosses 36, and the other side or end of said base 31 is formed with a ledge or lip element 38 in a construction that is adapted for connection to the molding M similarly to the molding clip of Figs. 1–4, inclusive. In this form of the invention, the clip 30 is provided as a one-piece device with the shank formed from integral portions of the blank which define a stud adapted for snap fastening action in a panel opening 8 in the supporting panel or part F. In a preferred construction of this character, the base or body portion 31 is provided with an integral peripheral skirt portion 40 between each spring arm 35 and the ledge or lip element 38. These integral skirt portions 40 provide the base 31 in a generally channel-shaped formation which increases the strength and rigidity of said base 31, and the lower edges of said skirt portions 40, otherwise, are shaped in accordance with the contour of the supporting structure F in order to seat firmly and rigidly thereon in attached position. The skirt portions 40 carry integral legs 42 which extend downwardly from the base 31 of the clip and each of said legs 42 is provided with a similar shank construction comprising a resilient finger which is partially severed from one edge of each leg member 42, and said finger bent to define an outwardly inclined guide surface 44 merging into an inwardly inclined cam shoulder 45. The free ends of the leg members 42 preferably are in abutting relation at the point of the shank to add stiffness to said legs 42 and rigidity to the shank thus provided.

The clips 30 are attached in connected relation with the molding M by the spring arms 35 engaging the molding flange 1 and the ledge 38 engaging the molding flange 5 in the same general manner described with reference to Figs. 1–4, inclusive, with the shank of each clip defined by the leg portions 42 projecting from the underside of said molding M. In mounting the molding, the projecting shank of each clip 30 is readily entered into its associated opening 8 in the panel F or other support inasmuch as said legs 42 preferably taper to a point which is much smaller than the size of the panel opening 8.

Axial pressure is then applied to the crown 4 of the molding M in the area of the base 31 of each clip 30 to move the shank legs 42 axially into the panel opening 8, whereupon the outwardly inclined guide surfaces 44 on said legs 42 cam against the marginal edges of the panel opening 8 to cause a gradual contraction of said legs 42 as necessary for the same to pass through said opening 8 to a position in which the cam shoulders 45 spring outwardly into engagement with the marginal portion of said panel opening 8, substantially as shown in Fig. 6. Preferably said shoulders 45 are provided in the form of diverging cam surfaces, as shown, which are adapted to ride on the lower corner edge of the panel opening 8 and automatically seat in fastening engagement with such lower corner edge of the panel opening 8 in the most effective manner even though the marginal portion of said panel opening 8 may not be of proper thickness or has some slight irregularity. In addition, such shoulders 45 in the form of cam surfaces adapt the clip for effective application to panels of different thicknesses within limits, and otherwise provide a suitable axial drawing action on the shank legs 42 which pulls the molding M tightly against the supporting structure F in mounted position. Inasmuch as the spring arms 35 and the ledge or lip element 38 of each clip are firmly interlocked with the molding flanges 1 and 5, respectively, there is no tendency for the clips 30 to become displaced from attached position with the molding during the operation of forcing the shank legs 42 of each clip to secured position in its panel opening 8.

The molding clips 30, likewise, are adapted for mounting the molding M in the alternate procedure described with reference to Figs. 1–4, inclusive, wherein the required number of molding clips 30 are first secured in a similar number of correspondingly spaced openings 8 in the supporting part F along the path which the molding extends in mounted position thereon substantially as illustrated in dotted lines in Fig. 1. The molding M is then applied, likewise, to the previously attached clips 30 by first slipping the flat flange 1 behind and under the bosses 36 on the free ends of the spring arms 35 to seat said bosses 36 in the rounded corner 2 adjacent said flat flange 1 of the molding M. The molding is then pressed transversely downwardly and toward the supporting part F in a manner whereby the spring arms 35 are compressed as necessary to permit the hook-like flange 5 of the molding to snap over and engage the ledge or lip element 38 in positively connected relation therewith to provide a completed molding installation of the same general character as that described with reference to Figs. 1–4, inclusive.

The base or body portion 11 of the molding clip of Figs. 1–4, inclusive, and the complete molding clip of Figs. 5 and 6 are constructed of relatively thin sheet metal, the thickness of which is selected according to service requirements and the predetermined size of the molding or similar part to be secured. The fasteners are most effective when provided of spring metal suitably tempered and otherwise treated to give the desired toughness and hardness. A cheap but effective fastener may be provided from cold rolled metal, such as cold rolled steel, which is untempered but of a spring metal nature and capable of providing an effective and reliable clip or fastener for a molding installation or the like, in accordance with the invention.

While the invention has been described in detail with specific examples, such examples are intended as illustrations only, inasmuch as it is quite apparent that modifications in the construction, arrangement and general combination of parts and elements of the clips or fasteners of the invention may be provided without departing from the spirit and scope of the invention.

What is claimed is:

1. A molding clip for mounting a molding having inturned flanges, said clip comprising a piece of sheet metal providing a plate-like base adapted to extend generally transversely of the molding between said inturned flanges, a shank depending from said base adapted to be secured in an opening in a support to mount the molding on the support, said base having opposite strip portions defining a pair of longitudinal spring arms diverging outwardly in opposite directions beyond said base and adapted to extend generally lengthwise of said molding in connected relation therewith, each of said spring arms being provided as an extension of said strip portions and being bent substantially normal to said base such that the molding engaging surfaces of said spring arms are yieldable transversely of the molding and adapted for surface engagement with the wall of the molding adjacent one of said inturned flanges of the modling, said base having another portion comprising a cam surface leading to a ledge adapted for connected relation with the other inturned flange of said molding, said ledge being spaced from the molding engaging surfaces of said spring arms when untensioned a distance greater than the space between the wall portions of the molding adjacent said inturned flanges, whereby said molding clip is adapted to be connected to the molding by first connecting said spring arms to the associated flange of the molding and causing said spring arms to yield as the other flange of the molding slides over said cam surface into connected relation with said ledge.

2. A molding clip as claimed in claim 1 in which said strip portions and arms are bent upwardly in substantially normal relation to said base, and said shank is provided by a bolt depending from said base.

3. A molding clip as claimed in claim 1 in which said strip portions and arms are bent downwardly in substantially normal relation to said base, and said shank comprises a pair of integral leg members depending from said base.

References Cited in the file of this patent

UNITED STATES PATENTS

| | | |
|---|---|---|
| 2,154,712 | Van Uum | Apr. 18, 1939 |
| 2,184,255 | Kral | Dec. 19, 1939 |
| 2,249,902 | Kral | July 22, 1941 |
| 2,295,449 | Churchill | Sept. 8, 1942 |
| 2,515,895 | Poupitch | July 18, 1950 |
| 2,677,862 | Flora | May 11, 1954 |